United States Patent
Wu et al.

(10) Patent No.: US 10,630,206 B2
(45) Date of Patent: Apr. 21, 2020

(54) LIGNIN-BASED BIOPOLYMER AND TRIBOELECTRIC NANOGENERATORS USING LIGNIN-BASED BIOPOLYMER

(71) Applicant: Purdue Research Foundation, West Lafayette, IN (US)

(72) Inventors: Wenzhuo Wu, West Lafayette, IN (US); Ruoxing Wang, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 227 days.

(21) Appl. No.: 15/973,811

(22) Filed: May 8, 2018

(65) Prior Publication Data

US 2018/0351477 A1 Dec. 6, 2018

Related U.S. Application Data

(60) Provisional application No. 62/512,907, filed on May 31, 2017.

(51) Int. Cl.

| | |
|---|---|
| *H02N 1/00* | (2006.01) |
| *C08L 3/00* | (2006.01) |
| *H02N 1/04* | (2006.01) |
| *C08H 7/00* | (2011.01) |
| *C08L 3/02* | (2006.01) |
| *C08L 97/00* | (2006.01) |

(52) U.S. Cl.
CPC ............... *H02N 1/04* (2013.01); *C08H 6/00* (2013.01); *C08L 3/02* (2013.01); *C08L 97/005* (2013.01)

(58) Field of Classification Search
CPC ... H01B 1/00; H01B 1/12; H02N 1/04; B29C 43/02; C08L 3/02; C08L 5/00
See application file for complete search history.

(56) References Cited

U.S. PATENT DOCUMENTS 10,472,500 B2 * 11/2019 Wu .................. C08B 37/003
2017/0359001 A1 12/2017 Wang et al.

FOREIGN PATENT DOCUMENTS

KR 101829541 B1 2/2018

OTHER PUBLICATIONS

Stevens et al "Thermoplastic Starch-Kraft Lignin-Glycerol Blends", Journal of Biobased Materials and Bioenergy, vol. 1, No. 3, Dec. 2007 (pp. 351-359).*
Shi et al "Synthesis and characterization of cross-linked starch/lignin film", Starch/Starke 2016, 68, 1224-1232.*
Delville et al "Solid state photocrosslinked starch based films . . .", Carbohydrate Polymers 49 (2002) 71-82.*
Vengal et al "Processing and study of novel lignin-starch and lignin-gelatin biodegradable polymeric films", Trends Biomater. Artif. Organs, vol. 18(2), Jan. 2005.*
Bao et al "Lignin biopolymers based triboelectric nanogenerators", APL Mater. 5, 2017 (May 31, 2017).*

* cited by examiner

*Primary Examiner* — Mark Kopec
(74) *Attorney, Agent, or Firm* — Purdue Research Foundation; Zhigang Rao

(57) ABSTRACT

The present disclosure generally relates lignin-based biopolymers and triboelectric nanogenerators comprising lignin-based biopolymer. Such triboelectric nanogenerators can generate voltage and current by using the triboelectric effect. The lignin-based biopolymers is a reaction product of a mixture comprising at least a lignin and a starch, and optionally an alcohol and/or a base.

7 Claims, No Drawings

LIGNIN-BASED BIOPOLYMER AND TRIBOELECTRIC NANOGENERATORS USING LIGNIN-BASED BIOPOLYMER

CROSS REFERENCE TO RELATED APPLICATIONS

This patent application claims benefit of U.S. Provisional Patent Application Ser. No. 62/512,907 filed May 31, 2017, which is incorporated herein by specific reference.

TECHNICAL FIELD

The present disclosure generally relates lignin-based biopolymers and triboelectric nanogenerators comprising lignin-based biopolymer. Such triboelectric nanogenerators can generate voltage and current by using the triboelectric effect.

BACKGROUND

This section introduces aspects that may help facilitate a better understanding of the disclosure. Accordingly, these statements are to be read in this light and are not to be understood as admissions about what is or is not prior art.

Recently, energy harvesting through sustainable approaches has become of interest not only to address the global energy crises but also to provide power for micro-scale electronics and sensors in emerging applications such as wearable and implantable devices. An assortment of technologies has been developed to transform environmental energy into electrical power via a variety of mechanisms, including electromagnetic, electrostatic, piezoelectric, and recently, triboelectric processes. Triboelectric nanogenerators (TENG) are highly capable of efficiently harvesting ubiquitous mechanical energy, hinged on principles of contact triboelectrification and electrostatic induction, and have received considerable attention in recent years. See Wang, Zhonglin, Triboelectric nanogenerators as new energy technology and self-powered sensors—Principles, problems and perspectives. *Faraday Discuss,* 2014, 176, 447-458. Ongoing efforts are primarily focused on augmenting power generation by increasing triboelectrification surface area, engineering the physical/chemical properties of contacting surfaces and implementing practical applications. Most of the demonstrated TENGs were built based on synthetic polymers for the ease and cost of manufacturability. However, TENGs utilizing naturally abundant biological materials has received considerably less attention. Obstacles concerning practical, eco-friendly utilization of TENGs such as the intricate fabrication and expensive machinery continue to prevail.

Lignin, despite being the second most abundant biopolymer on earth, has few practical applications and a small market value starting from around $300 per ton. Water insoluble Kraft lignin, being the most abundant side product, is produced by the pulp and paper industry at a scale of 50-100 million tons per annum, most of which is nevertheless burned as a cheap fuel, an economically unfeasible solution. Current applications of lignin are scarce, using only approximately 2%-5% of all lignin produced, and primarily utilize lignosulphonate, a chemically modified water-soluble lignin. Lignosulphonate supply is limited, and thus applications of lignin using insoluble Kraft lignin should be conceived. Current utilization of lignin includes binders for animal feed, bricks, ceramics and road dust, in addition to adhesives. This limited employment is mostly due to the undefined, remarkably irregular structure of lignin, which is a highly branched, hydrophobic, three-dimensional biopolymer of p-hydroxyphenyl propanoid units. Still, the presence of highly active functional groups results in lignin being exceptionally accessible for chemical modification or polymerization to create high-value materials e.g. carbon fibers and artificial perfumes. However, many of these applications for Kraft lignin are low yielding or manufactured at a small scale.

Being an antioxidant, naturally degradable, biocompatible, and lacking in cytotoxicity, lignin offers a valuable opportunity as potential constituents in biomedical devices. The vast disparity in structure and surface properties make it finely tunable for controlled degradation which is desirable in implanted applications.

There remains a need to develop new lignin biopolymers and explore the new utilities of such lignin biopolymers.

SUMMARY

A novel lignin-derived nano-composite is developed by integrating starch, lignin, and some other optional additives to facilely produce a biocompatible film for harvesting mechanical energy via TENG methodology.

In one embodiment, the present disclosure provides a lignin-based biopolymer wherein the lignin biopolymer comprising a reacting product of a mixture comprising at least a lignin and a starch.

In one embodiment, the present disclosure provides a lignin-based biopolymer wherein the lignin biopolymer comprising a reacting product of a mixture comprising at least a lignin, a starch, and an alcohol.

In one embodiment, the present disclosure provides a lignin biopolymer wherein the lignin biopolymer comprising a reacting product of a mixture comprising at least a lignin, a starch, an alcohol, and a base.

In one embodiment, the present disclosure provides a triboelectric nanogenerator wherein the triboelectric nanogenerator comprises a lignin-based biopolymer, wherein the lignin-based biopolymer comprises a reacting product of a mixture comprising at least a lignin and a starch.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

In the present disclosure the term "alcohol" may refer to any organic compound in which at least one hydroxyl functional group (—OH) is bound to a saturated carbon atom.

In the present disclosure the term "glycol" may refer to any organic compound in which two hydroxyl functional group (—OH) are bound to different saturated carbon atoms. Glycols can be represented by the general formula $C_nH_{2n}(OH)_2$, where n is 2 to 12. Examples of glycols (diols) are ethylene glycol (glycol), propylene glycol (1,2-propanediol), 1,4-butanediol, 1,5-pentanediol, 1,6-hexanediol, 1,10-decanediol, 1,7-heptanediol, 1,9-nonanediol, 1,8-oetanediol, 1,3-propanediol, 1,3-butanediol, 1,4-butanediol, 2,3-butanediol, 2,4-pentanediol, 2,5-hexanediol, 4,5-octanediol and 3,4-hexanediol. Examples of other noncyclic glycols (diols) are neopenty glycol, pinacol, 2,2-dieth 3-1,3-propanediol, 2-ethyl-1,3-hexanediol, 2-ethyl-2-butyl-1,3-propanediol, isobutylene glycol, 2,3-d jmethyl-1,3-propanediol, 1,3-diphenyl-1,3-propanedio3,3-methyl-1,3-butanediol.

Examples of cyclic glycols are 1,4-cyciohexanedimethanol and p-xylylene glycol. Examples of polyglycols are polyethylene glycols and polypropylene glycols.

Examples of glycol (diol) derivatives which are esters are ethylene glycol monostearate, ethylene glycol distearate, ethylene glycol amido stearate, propylene glycol monostearate, propylene glycol dicapr late, propylene glycol dicaprate diacetate glycol, diiaurate glycol, dipaimite glycol, diforniate glycol, dibutyrate glycol, dibenzorate glycol, dipalmate glycol, diproptonate glycol, monoacetate glycol, monopalmitate glycol and monoformate glycol. Diethylene glycol monostearate is also an ester derivative.

Examples of polyglycol (polydiol) derivatives which are esters are polyethylene glycol (PEG) 200-6000 mono and dilaurates, such as, PEG 600 diiaurate, PEG 600 monolaurate, PEG 1000 diiaurate, PEG 1000 mosiolaurate, PEG 1540 diiaurate and PEG 3540 monolaurate, polyethylene glycol 200-6000 mono and dioleates, such as, PEG 400 monoieate, PEG 600 dioleate, PEG 600 monooleate, PEG 1000 monoieate, PEG 1540 dioleate, PEG 1540 monooleate and polyethylene glycol 200-6000 mono and distearates, such as, PEG 400 distearate, PEG 400 monostearate, PEG 600 distearate, PEG 600 monostearate, PEG 1000 distearate, PEG 3000 monostearate, PEG 1540 distearate, PEG 1540 monostearate and PEG 3000 monostearate.

In the present disclosure the term "triol" may refer any substance containing three hydroxyl groups, such as glycerol. A "triol derivative" may refer to glycerol esters such as glycerol monostearate, glycerol distearate, glycerol monooleate, glycerol monolaurate, glycerol dilaurate, glycerol dipalmitate, glycerol monopalmitate, glycerol triacetate, glycerol tribenzoate, glycerol tributyrate, glycerol trimyristate, glycerol trioleate, glycerol trilaurate, glycerol, tripalmitate and glycerol tristearate.

In the present disclosure the term "base" may refer any substance that in water solution is slippery to the touch, tastes bitter, changes the color of indicators (e.g., turns red litmus paper blue), reacts with acids to form salts, and promotes certain chemical reactions (base catalysis). Examples of bases are the hydroxides of the alkali and alkaline earth metals (sodium, calcium, etc.) and the water solutions of ammonia or its organic derivatives (amines). Such substances produce hydroxide ions (OH—) in water solutions.

In the present disclosure the term "lignin" and "starch" may refer any naturally obtained or modified substances that a skilled artisan may appreciate and realize the such substances are in the broad categories of such substances. There may be some variations among the substances depending the origination of the substances.

The present disclosure provides a novel lignin-derived nano-composite where lignin is integrated with starch to facilely produce a biocompatible film for harvesting mechanical energy via TENG methodology. By adding some additional additives such as an alcohol or a base or both, and adjust the ratios of the components in the nano-composite, a novel lignin based biopolymer can be prepared to systematically engineer the physical and chemical properties of the nanocomposites for optimized triboelectric power generation, transforming the otherwise wasted biomaterials into functional devices as flexible TENG. This opens doors to new technologies that utilize waste materials for economically feasible and ecologically friendly systems in self-powered biomedical applications.

In one embodiment, the present disclosure provides a lignin-based biopolymer wherein the lignin-based biopolymer comprises a reacting product of a mixture comprising at least a lignin and a starch.

In one embodiment, the present disclosure provides a lignin-based biopolymer wherein the lignin-based biopolymer comprises a reacting product of a mixture comprising at least a lignin, a starch, and an alcohol. In one aspect, the alcohol may be a glycol, glycerol, a glycol derivative, a glycerol derivative, or any combination thereof.

In one embodiment, the present disclosure provides a lignin-based biopolymer wherein the lignin-based biopolymer comprises a reacting product of at least a lignin, a starch, an alcohol, and a base. In one aspect, the alcohol may be a glycol, glycerol, a glycol derivative, a glycerol derivative, or any combination thereof; the base may be a hydroxide of the alkali and/or alkaline earth metals (sodium, potassium, and/or calcium).

In one embodiment, the present disclosure provides a lignin-based biopolymer wherein the lignin-based biopolymer comprises a reacting product of a mixture comprising at least a lignin, a starch, an alcohol, and a base, wherein the alcohol may be a glycol, glycerol, a glycol derivative, a glycerol derivative, or any combination thereof.

In one embodiment, the present disclosure provides a lignin-based biopolymer wherein the lignin-based biopolymer comprises a reacting product of a mixture comprising at least a lignin, a starch, an alcohol, and a base, wherein the base comprises one or more hydroxides of the alkali and alkaline earth metals (sodium, potassium, and/or calcium).

In one embodiment, the present disclosure provides a triboelectric nanogenerator wherein the triboelectric nanogenerator comprises a lignin-based biopolymer, wherein the lignin-based biopolymer comprises a reacting product of a mixture comprising at least a lignin and a starch.

In one embodiment, the present disclosure provides a triboelectric nanogenerator wherein the triboelectric nanogenerator comprises a lignin-based biopolymer, wherein the lignin-based biopolymer comprises a reacting product of a mixture comprising at least a lignin, a starch, and an alcohol. In one aspect, the alcohol may be a glycol, glycerol, a glycol derivative, a glycerol derivative, or any combination thereof.

In one embodiment, the present disclosure provides a triboelectric nanogenerator wherein the triboelectric nanogenerator comprises a lignin-based biopolymer, wherein the lignin-based biopolymer comprises a reacting product of a mixture comprising at least a lignin, a starch, an alcohol, and a base. In one aspect, the alcohol may be a glycol, glycerol, a glycol derivative, a glycerol derivative, or any combination thereof; the base may be a hydroxide of the alkali and/or alkaline earth metals (sodium, potassium, and/or calcium).

In one aspect, the present discloses a triboelectric nanogenerator (TENG) that comprises a first contact charging member and a second contact charging member. The first and second contact charging members each comprises a first contact layer and a second conductive electrode layer. The first contact layer has a contact side and an opposite backside. The first contact layers of the first contact charging member and the second contact charging member each comprises a different material that has a triboelectric series rating indicating a propensity to exchange electrons between the two first contact layers due to a contacting event. The second conductive electrode layer is disposed along the back-side of the first contact layer. The second contact charging member is spaced apart from and disposed oppositely from the first contact charging member. The second conductive electrode layer is configured to act as an electrode. A mechanism is configured to maintain a space between the first contact charging member and the second contact charging member except when a force is applied thereto. One of the two said first contact layers comprises lignin-based biopolymer of the present disclosure wherein the lignin-based biopolymer is a reaction product of a mixture comprising lignin and starch, and may further comprise glycerol and/or a base. The other said first contact layer comprises a different polymeric material other than the lignin-based biopolymer of the present invention. The different polymeric material may be but is not limited to a polyimide polymer. In one aspect, the polyimide polymer has a repeating unit of formula I, n is 1-10000. A commercial available polyimide polymer is Kapton developed by DuPont™.

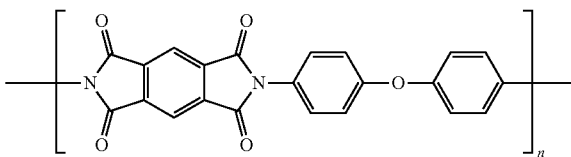

(I)

In one embodiment, the present disclosure provides a triboelectric nanogenerator wherein the triboelectric nanogenerator has an output power density of 125-250 nW/cm², 125-200 nW/cm², 125-175 nW/cm², 150-250 nW/cm², 150-250 nW/cm², 150-200 nW/cm² 150-175 nW/cm².

In any embodiment of the present disclosure, the weight percentage of lignin is 2-98%, 5-95%, 10-90%, 10-80%, 10-70%, 10-60%, 10-50%, 10-40%, 10-30%, 10-20%, 20-90%, 20-80%, 20-70%, 20-60%, 20-50%, 20-40%, 20-30%, 30-90%, 30-80%, 30-70%, 30-60%, 30-50%, 30-40%.

In any embodiment of the present disclosure, the weight percentage of starch is 2-98%, 5-95%, 10-90%, 10-80%, 10-70%, 10-60%, 10-50%, 10-40%, 10-30%, 10-20%, 20-90%, 20-80%, 20-70%, 20-60%, 20-50%, 20-40%, 20-30%, 30-90%, 30-80%, 30-70%, 30-60%, 30-50%, 30-40%.

In any embodiment of the present disclosure, the weight percentage of an alcohol is 0.1-30%, 0.5-30%, 1-30%, 2-30%, 3-30%, 4-30%, 5-30%, 10-30%, 0.5-20%, 0.5-10%, 0.5- 5%, 0.5-3%, 1-20%, 1-10%, 1-5%, 1-3%.

In any embodiment of the present disclosure, the weight percentage of a base is 0.1-30%, 0.5-30%, 1-30%, 2-3%, 3-30%, 4-30%, 5-30%, 10-30%, 0.5-20%, 0.5-10%, 0.5-5%, 0.5-3%, 1-20%, 1-10%, 1-5%, 1-3%.

In any embodiment of the present disclosure, the molar concentration of a base is 0.01-10 M, 0.01-5 M, 0.01-2.5 M, 0.01-1.0 M, 0.01-0.5 M, 0.01-0.25 M, 0.01-0.1 M, 0.1-5.0 M, 0.1-2.5M, 0.1-1.0 M, 0.1-05 M, 0.1-0.25M.

The structure of a lignin-based nano-composite TENG may comprise a lignin-based film and a Kapton film, both of which are backed by copper electrodes. Lignin-based films were developed using natural waste materials and are biodegradable, eco-friendly, and low cost. According to the triboelectric series, Kapton has a stronger ability to acquire electrons while wood, of which lignin is a part, has a stronger tendency to lose electrons. When the lignin-based nano-composite film is brought into contact with the Kapton film, the difference from these triboelectric polarities leads to electrons flowing between the two films. The direction of electron flow is dictated by the relative difference in the surface properties, e.g. the surface work function, between the two films. Such surface properties of interest for the triboelectrification process are strongly dependent on the composition and preparation of the nanocomposites. In a typical case where the as-prepared lignin nano-composite induces positive triboelectric charges upon the contact with the Kapton film. Separation of the two films results in a potential difference between the two electrodes and causes electrons to flow in the opposite direction. These mechanically-induced contact and separation events, therefore, give rise to the output electrical power through the back-and-forth flow of electrons in the external circuit. A linear motor is applied to apply the controlled mechanical stimuli, with a peak force of 2.08 N bringing the electrode to contact.

EXPERIMENTS

Three groups of nanocomposites were prepared to develop lignin-derived TENG with engineered functionalities, e.g. stretchability and transparency, that are appealing for biomedical applications.

The first group includes composites of lignin and starch. Since lignin is made of insoluble fibers that could not form a uniform film or gel by itself, starch was added to bind the lignin materials into a stable film. For the untreated films, a total of 1.064 g of Kraft lignin (Sigma-Aldrich) and potato starch (Alfa Aesar) were added to 10 mL water in the weight ratios of 1:9, 3:7, 5:5, and 7:3. The samples were stirred for 20 minutes at 135° C. until the starch gelatinized, and the solutions were slightly viscous. Each sample was then transferred into a square mold where it was further dried for approximately 24 hours.

The second group of composites was prepared by mixing the lignin-starch films obtained from the above procedures with glycerol. For the films with glycerol, lignin, and starch in the weight ratio of 3:7 were added to 15 mL water and stirred for 20 minutes at 135° C., similarly to the procedure above. Then, glycerol was added at 3%, 6%, 9%, and 12% of the original solution weight. This mixture was stirred for 5 additional minutes at the same temperature and transferred to the square molds where they were dried for approximately 48 hours.

The third group was prepared by adding glycerol and sodium hydroxide to the lignin-starch composites. 0.1594 g lignin was dissolved in 10 mL each of 0.25 M NaOH, 0.5 M NaOH, and 0.75 M NaOH and stirred for 5 minutes to ensure dissolution. For each sample, 1.4345 g starch was added to 5 mL water and stirred for 20 minutes at 135° C. Then, the lignin solution and 0.9 g glycerol was added to the starch mixture and stirred for 5 minutes. This was transferred to plastic molds of dimensions 6.5 cm by 6.5 cm and dried for 48 hours.

Fourier Transform Infrared Spectroscopy (FTIR) was used to examine the interactions between the constituents of the composite films. Peaks at 1440 cm$^{-1}$ and 2910 cm$^{-1}$ indicate C—H bond bending and stretching respectively. It can be seen that films containing NaOH have an intensified peak at 1440 cm$^{-1}$ which are likely to be caused by the cleavage of the ether linkage between the p-hydroxyphenyl propanoid units in lignin. This is supported by the peak at approximately 1010 cm$^{-1}$, which is attributed to the C—O stretching in starch and lignin. Meanwhile, the peak at 3305$^{-1}$ is accredited to the vibration of OH groups in starch, glycerol, and/or lignin stretching, in addition to the formation or lack thereof of intra- and inter-molecular hydrogen bonds. It can be seen that starch has a higher peak than lignin, most likely from the disruption of hydrogen bonding between the starch molecules by the relatively large lignin particles. Also, it can be clearly seen that glycerol has a profound effect as the peak attributed to the vibration of OH groups is intensified. It is likely to be due to the increased number of hydroxyl groups and the increase in hydrogen bonding between glycerol and starch. These interactions have a profound effect on the TENG outputs of the final films.

Pure starch and lignin-starch films without any additives tend to be brittle and delicate, as shown. The surface of pure starch film is very smooth. The SEM image from the edge of pure starch film was taken in comparison with the pure starch to demonstrate its flat surface. Moreover, the films demonstrate increased surface roughness with the increase in lignin to starch concentration, most likely caused by the large lignin particle size compared to the gelatinized starch. Likewise, the hydrophobic lignin particles could disrupt the crosslinking within the starch matrix making the films weaker with the addition of lignin. However, the surface roughness caused by the lignin particles expands the area with which the Kapton film makes contact for potential triboelectrification. Such an increase in the surface area led to enhanced triboelectrification which, in turn, ensues the increase in the output short-circuit current and open-circuit voltage from the pure starch film to the 3:7 lignin-starch film. It was further performed a one-way analysis of variance (ANOVA) to reveal the difference between the electrical outputs of these nanocomposites. The results of a multiple-comparison of the group means for triboelectric current with the p-value <<0.05 showed that there was a statistically significant difference between the starch group and the other four groups, suggesting that the lignin significantly influences the TENG performance. The increased output could also be caused by the decrease in free hydroxyl groups. Starch consists of numerous hydroxyl groups and oxygen atoms, which have high electronegativity. However, lignin is a large molecule that could significantly disrupt the hydrogen bonding between starch chains, which is supported by the FTIR data as seen by the decrease in peak intensity at 3305 cm$^{-1}$. This reduction in free hydroxyl groups results in a relative weaker ability to absorb electrons thus increasing the differences between lignin-starch films and Kapton. Hence, the electrical outputs improved noticeably by coupling the surface engineering and material modification. Interestingly, it can also be seen that the TENG output decreases with further increasing the lignin-starch ratio. The decreases in output for films with 5:5 and 7:3 lignin-starch ratios are expected to be induced by the aggregated lignin clusters. When the intermolecular reactions between lignin and starch were saturated, the excess lignin molecules aggregated as clusters. Those lignin units have relatively high conductivity compared with the uniform films, weakening the ability to trap electrons, which means the attracted electrons cannot be effectively induced in electrodes. Overall, the electrical outputs were attenuated. When the lignin-starch ratio is 1:9 or 3:7, the lignin addition was not substantial enough to result in a significant decrease in the TENG output, while the increase in the electrical output due to the enhanced surface area and electronegativity dominates. Thus, the largest output observed through these films is the 3:7 lignin-starch film which could achieve an average short-circuit current of up to 3.96 nA/cm$^2$ and an open-circuit voltage of 1.04 V/cm$^2$. However, produced through a casting process, these films tend to deform with curvatures and break easily, lacking the mechanical and morphological stability necessary for practical applications.

Films with glycerol were attempted to improve both the mechanical and TENG properties of the films. Since the 3:7 lignin-starch film resulted in the highest TENG output, this ratio was selected to further investigate the effects of glycerol. It was observed that even with the smallest addition of glycerol (3% w/w), the film drastically improved in strength and flexibility, making it much more useful in practical applications and this pattern continued with the increase in glycerol. Optical images demonstrate films that are less likely to crack and break with the addition of glycerol. This improvement in stability is probably due to the OH groups in glycerol which interact with $H_2O$ from the original casting solution through the hydrogen bond, resulting in more flexible films. However, as glycerol concentration increases, more $H_2O$ stays within the film instead of evaporating, resulting in softer and more delicate films. Also owing to the OH groups in glycerol, it can be seen that glycerol additionally has a favorable effect on the TENG properties of the film. The ANOVA results of a multiple-comparison of the group means for triboelectric current with the p-value <<0.05 suggest that the added glycerol significantly influences the TENG performance. The observed polarity reversal of the TENG output from the original films to those with glycerol is, in part, likely to be induced by the dramatic increase in OH groups from the glycerol, as supported by the FTIR data. With more free hydroxyl groups, which have high electronegativity, the ability of lignin-based films for attracting electrons are improved, even stronger than that of Kapton, resulting in the reversal of the electrical output direction. The initial decrease in output current with the 3% supplement of glycerol is caused by the relatively small addition of glycerol, offsetting the original electron-losing tendency of lignin-starch films; however, with the increase of glycerol to 6%, the output is significantly enhanced, with the highly electronegative hydroxyl groups giving rise to a larger potential difference between the lignin-starch and the Kapton films. Also, it can be seen that the output decreases in the films with 9% and 12% glycerol due to the tendency of the hydroxyl groups to hydrogen bond to $H_2O$. The excess $H_2O$ dominates the interactions between the two films, leading to a lower output. Nevertheless, flexible films such as these have great potential in the electronic skin, wearable devices, and self-powered sensor systems.

Efforts were further made to develop a transparent and more stretchable film by dissolving the large particles of lignin in NaOH. The composite film with a ratio of 1:9 lignin-starch ratio was selected for this study due to the relatively high TENG output produced by this composite film and its improved transparency compared to that of the 3:7 lignin-starch film. Additionally, 6% glycerol was added to the composite as this film had the highest output when the lignin to starch ratio is 3:7. Lignin-based films with NaOH were fabricated by the method described above. The resulting films were more elastic, transparent, and stable than those without NaOH. The transparency of the composite was drastically improved with the addition of 0.25 M NaOH. However, the transparency became noticeably worse as the concentrations of NaOH increased. This is probably due to the increased concentration of smaller molecules that have the ability to settle more densely. The sample with 0.25 M NaOH was more translucent than the rest which could be due to the decrease in the size of the particles making it more transparent than the film without NaOH, but not small enough to densely pack the film.

The addition of NaOH also increases the TENG output of the composite films, which is further confirmed by the one-way ANOVA analysis. Such enhancement is likely to be due to the decrease in the conductivity of lignin. Lignin is intrinsically conductive, but the cleavage of ether bonds by NaOH could reduce this, resulting in a higher dielectric constant and enhanced TENG output with more efficient charge transfer. Interestingly, it can be seen that there is a decrease in output from the film with 0.5M NaOH to the film with 0.75 M NaOH. At this point, it is expected that NaOH has reacted with all possible bonds within the lignin particles. Afterward, extra NaOH remaining in films functions as the ionic conductor, partially shadowing the electrons transfer and leading to decreased electrical outputs. A maximum output power density of 173.5 nW/cm$^2$ was achieved for the composite film with 0.50 M NaOH. This was calculated from the product of the voltage and current under different loads. Transparent films such as these have many potential applications such as for harvesting energy from water or for raindrops on solar cells. Also, the gained stretchability might enable applications in the novel flexible electronics. Furthermore, the long-term mechanical durability of lignin-based TENG using a lignin-composite film with 6% glycerol and 0.25M NaOH was also found. The open-circuit voltage is stable over 1 hour with 0.5 Hz frequency (about 1800 cycles of contact-separation). The good durability indicates the potential of lignin-based TENG for practical applications.

In conclusion, lignin biopolymer composite films were investigated to optimize the triboelectric power generation for practical applications. Properties of films were engineered by chemical and physical modifications. Statistical analysis was performed to guide the materials and device design. Using environmentally friendly and otherwise wasted materials, the present disclosure provides an economically feasible approach for producing flexible biopolymer based TENG that has a relatively high power density of 173.5 nW/cm$^2$. The lignin-based TENG demonstrated here shows great potential for self-powered biomedical devices, and opens doors to new technologies that utilize waste materials for economically feasible and ecologically friendly production of functional devices in energy, electronics, and sensor applications.

Those skilled in the art will recognize that numerous modifications can be made to the specific implementations described above. The implementations should not be limited to the particular limitations described. Other implementations may be possible.

The invention claimed is:

1. A triboelectric nanogenerator comprising a lignin-based biopolymer, wherein the lignin-based biopolymer comprises a reacting product of a mixture comprising at least a lignin and a starch, a polyimide polymer as a counter part of the lignin-based biopolymer, wherein the lignin-based biopolymer and the polyimide polymer are presented as lignin-based biopolymer film and polyimide film, wherein the lignin-based biopolymer film and polyimide film are backed by metal electrodes, and wherein when the lignin-based biopolymer film is brought into contact with the polyimide film, the difference from triboelectric polarities on two films leads to electrons flowing between the two films.

2. The triboelectric nanogenerator of claim 1, wherein the lignin-based biopolymer comprising a reacting product of a mixture comprising at least a lignin, a starch, and an alcohol.

3. The triboelectric nanogenerator of claim 2, wherein the lignin-based biopolymer comprising a reacting product of a mixture comprising at least a lignin, a starch, an alcohol, and a base.

4. The triboelectric nanogenerator of claim 3, wherein the alcohol is a glycol, a glycerol, a glycol derivative, a glycerol derivative, or any combination thereof.

5. The triboelectric nanogenerator of claim 4, wherein the base comprises a hydroxide of alkali and/or alkaline metals.

6. The triboelectric nanogenerator of claim 5, wherein the alcohol is glycerol, and the base is NaOH.

7. The triboelectric nanogenerator of claim 1, wherein triboelectric nanogenerator has an output power density of 150-250 nW/cm$^2$.

* * * * *